US005390403A

United States Patent [19]

Brueckert et al.

[11] Patent Number: 5,390,403
[45] Date of Patent: Feb. 21, 1995

[54] PIN PULLER FOR ARTICULATED CONNECTOR PINS

[75] Inventors: Richard A. Brueckert, Chicago; Richard P. Yeates, Aurora, both of Ill.

[73] Assignee: TTX Company, Chicago, Ill.

[21] Appl. No.: 162,998

[22] Filed: Dec. 8, 1993

[51] Int. Cl.[6] .......... B23P 19/04
[52] U.S. Cl. .......... 29/252
[58] Field of Search .......... 29/252, 258–262, 29/251

[56] References Cited

U.S. PATENT DOCUMENTS

| | | | |
|---|---|---|---|
| 4,558,502 | 12/1985 | Gossman et al. | 29/252 |
| 4,670,958 | 6/1987 | Hoffgen | 29/252 |
| 4,714,238 | 12/1987 | Spradley et al. | 29/252 |
| 4,870,739 | 10/1989 | Richards | 29/252 |
| 4,979,279 | 12/1990 | Garvey | 29/252 |
| 5,050,285 | 9/1991 | Wrage | 29/252 |
| 5,129,133 | 7/1992 | Reesor | 29/252 |

*Primary Examiner*—Robert C. Watson
*Attorney, Agent, or Firm*—Dorn, McEachran, Jambor & Keating

[57] ABSTRACT

A pin puller for extracting the main connector pin from an articulated connection such as in articulated railroad cars has concentric inner and outer sleeves relatively translatable by a hydraulic ram. The inner sleeve has legs which rest on top of the female articulated connector, straddling the main connector pin. The legs define a slot and support a platform. The outer sleeve has a cylindrical skirt which houses a boss, and is closed on top by a cover. The skirt and boss carry a first pin for connecting a yoke. The yoke has a second pin which connects to a loop in the top of the main connector pin. The ram rests on the platform and pushes the outer sleeve cover upwardly, causing the yoke and main connector pin to move upwardly also. The yoke can be interchanged with another yoke to accommodate other applications.

14 Claims, 2 Drawing Sheets

Fig. 1.
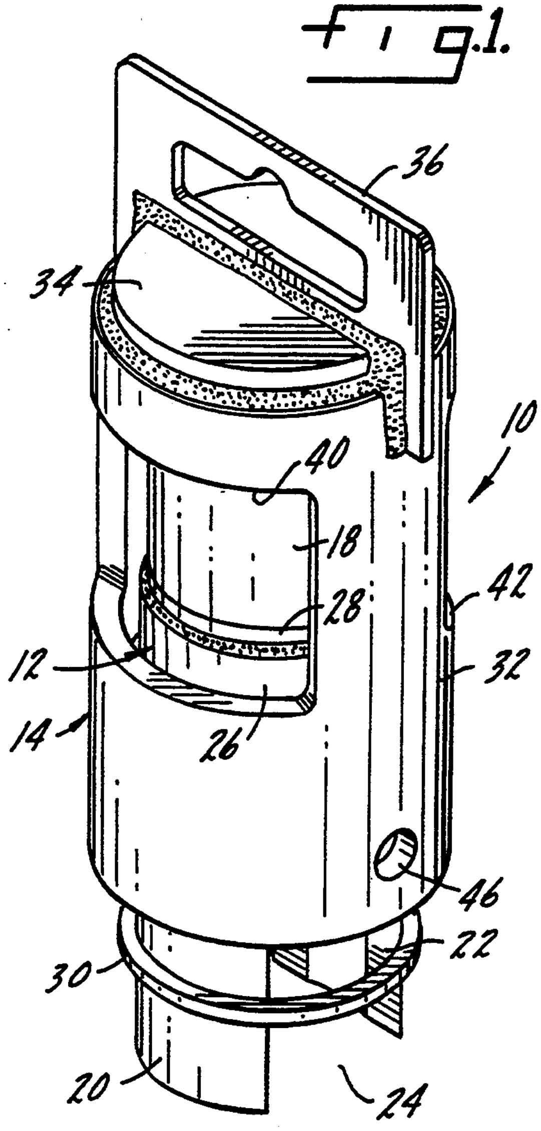
Fig. 2.
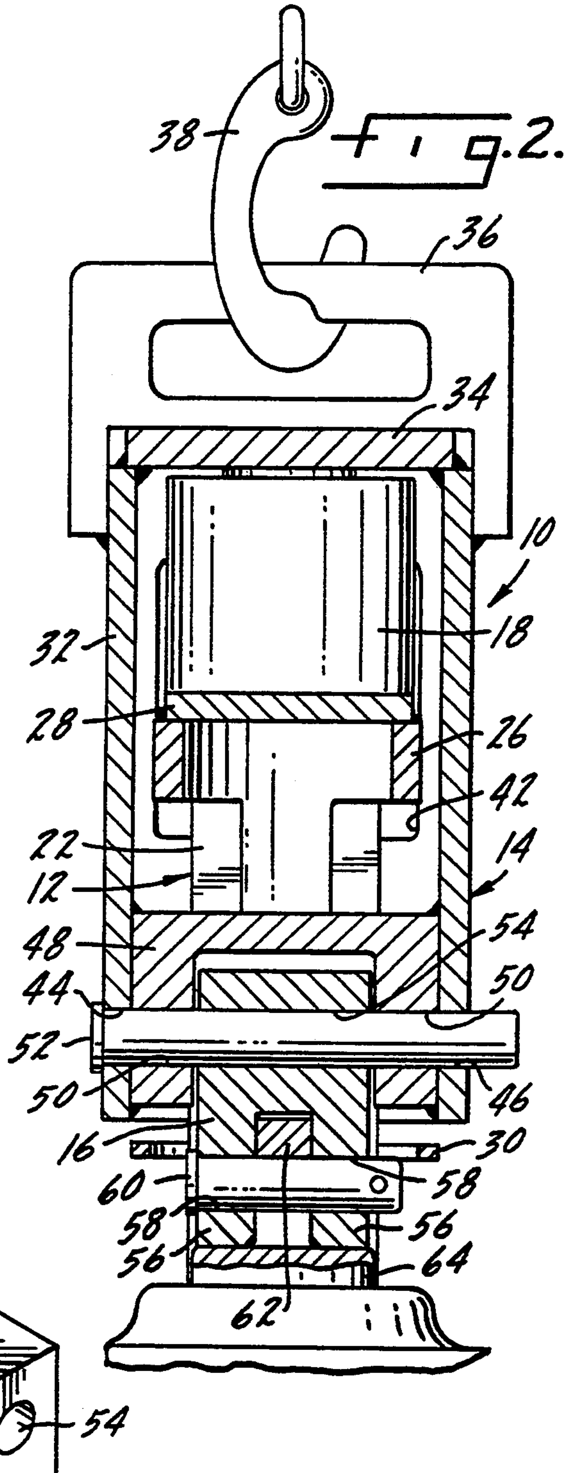
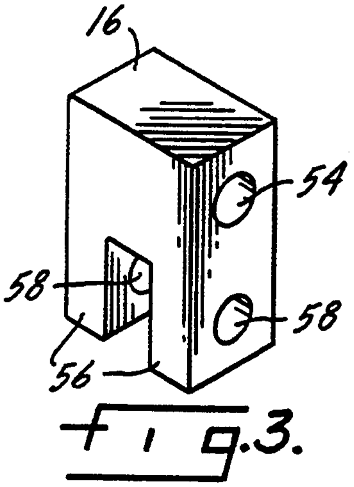
Fig. 3.
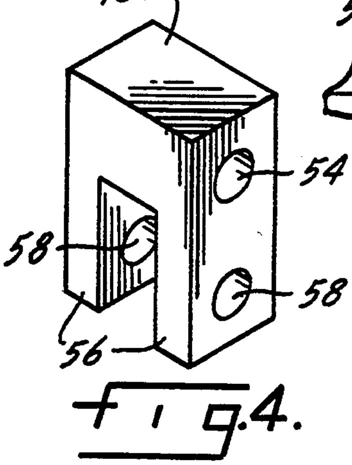
Fig. 4.

BEST AVAILABLE COPY

PIN PULLER FOR ARTICULATED CONNECTOR PINS

SUMMARY OF THE INVENTION

The growth of intermodal freight transportation has led to increased use of articulated railroad cars. These cars have between two and ten units or platforms joined together semi-permanently at articulated connections on shared trucks. Only the outer ends of the end platforms have their own trucks and standard couplers. The articulated connections are formed by male and female connector arms which define vertical openings and a center plate resting on the truck's bolster. The vertical openings define a pocket for receiving a main connector pin which joins the connector arms. Retainer pins and keys hold the main connector pin in the pocket.

Maintenance activities periodically require separation of the car's units which means the main connector pin has to be extracted from the pocket. Since the pocket only opens to the top, extraction can only be accomplished by pulling the pin out the top of the connection. Considerable force is frequently required to break the pin loose. Access to the pin, and connecting a pulling tool to it, can be difficult. Further complicating matters is the variety of designs of the pins and their retaining structures. A pulling tool suitable for one design may be unusable on a different type of connection.

The present invention addresses these problems by providing a pin puller that is compact in size, allows quick setup time and uses a standard hydraulic ram that can be removed for other purposes. The puller can be used universally on any car builder's design.

The pin puller of the present invention has a base having two upstanding legs spaced apart to define a slot. The legs rest atop the female connector arm of an articulated connection and support a raised platform at the top of the legs. An outer sleeve having a cylindrical skirt and an internal boss surrounds the base. The boss traverses the lower inside of the outer sleeve skirt and has a slot. A cover closes the top end of the skirt. Openings aligned with each other and the slot in the boss are formed at the bottom of the skirt. A yoke having first and second bores is insertable into the slot in the boss. The first bore is aligned with the skirt openings and the second bore is aligned with the loop of the main connector pin. A first pin connects the yoke to the skirt boss through the aligned first bore and skirt openings and a second pin connects the yoke to the main connector pin through the aligned second bore.

An actuator in the form of a removable hydraulic ram is placed between the inner sleeve platform and the outer sleeve cover. When the ram is extended, it moves the outer sleeve to a raised position, carrying the yoke and attached main connector pin with it.

BRIEF DESCRIPTION OF THE DRAWINGS

FIG. 1 is a perspective view of the pin puller.

FIG. 2 is a vertical section of the pin puller.

FIG. 3 is a perspective view of one type of yoke.

FIG. 4 is a perspective view of a different type of yoke.

DETAILED DESCRIPTION OF THE INVENTION

Figure 5:
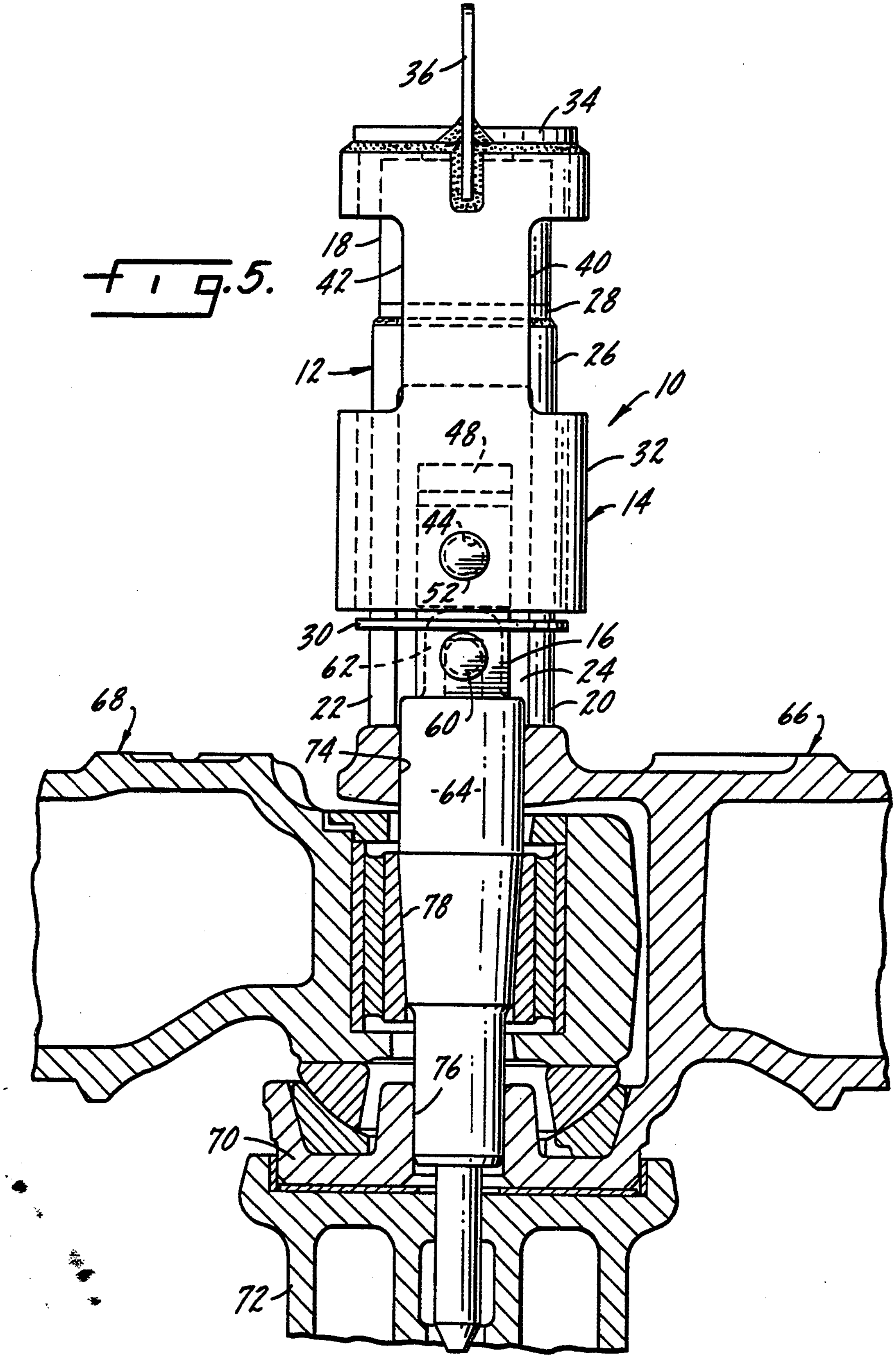
FIG. 5 is a side elevation view of a portion of an articulated connection with the pin puller in position to begin pulling the main connector pin.

FIGS. 1 and 2 illustrate the pin puller 10 of the present invention. The pin puller has four main components; an inner sleeve or base or bridge member 12, an outer sleeve or clevis 14, a yoke 16 and an actuator 18.

Looking first at details of the inner sleeve or base 12, it has a pair of arcuate legs 20, 22 which are spaced apart to define a slot or gap 24 between the legs. The legs extend upwardly to a platform which spans the legs and joins them together. The platform includes an annular portion 26 and a plate 28. Together the legs 20, 22 and platform 26, 28 define a compartment in the interior portion of the base 12. The bottom of the legs are strengthened by a ring 30 welded to the legs.

The outer sleeve 14 comprises a generally cylindrical skirt 32 which has an inside diameter slightly greater than the outside diameter of the base or inner sleeve such that the skirt surrounds the base. The top of the skirt is closed by a cover 34 which is welded to the top land of the skirt 32. A handle 36 is welded to the cover 34. The handle has a loop which accommodates the hook 38 of a small crane or similar device for moving the pin puller about.

The skirt has two large windows or apertures 40 and 42 in its upper half. These apertures provide access to the interior of the skirt and in particular provide access for installing or inserting the hydraulic ram 18 on top of the base 12. The lower end of the skirt has a pair of aligned openings 44, 46 on opposite sides thereof. These openings are reinforced by a U-shaped reinforcing block 48 (FIG. 2). The legs of this block also have openings 50 aligned with the openings 44, 46 in the skirt. Openings 50 permit the passage of a first pin 52 across the diameter of the skirt as seen in FIG. 2.

The yoke 16 is insertable into the bottom of the skirt and within the legs of the reinforcing block 48 as seen in FIG. 2. The yoke has an upper or first bore 54 through which the first pin 52 extends to connect the yoke to the skirt portion 32 of the outer sleeve. As seen in FIG. 3, the yoke has a pair of legs 56 which have aligned lower or second bores 58. The bores 58 receive a second pin 60 for connecting the yoke to the loop 62 formed at the top of the main connector pin 64. The loop 62 fits between the legs 56 of the yoke and is retained by the second pin 60. It can be appreciated that the size of the gap between the legs 56 of the yoke must be sized appropriately for the particular main connector pin loop. Thus, the yokes 16 are interchangeable with others of various sizes and types. FIG. 4 illustrates a slight variation of a yoke **16*a* having somewhat longer legs than that of FIG. 3. This will accommodate a taller or higher loop 62** in a different main connector pin design.

The actuator 18 is preferably a low profile 100 ton ram. The ram has a diameter of about $6\frac{1}{2}''$, a height of about $5\frac{1}{2}''$ and a $2\frac{1}{4}''$ stroke. The ram is connected to a suitable supply of hydraulic fluid through fluid lines which are not shown. One of the advantages of this invention is that the ram need not be dedicated solely to pin puller application. It can be used for other purposes in the maintenance shop.

The assembly of the pin puller is as follows. Prior to welding the cover 34 on the outer sleeve 14, the base 12 is inserted down through the top of the skirt 32. The legs 20, 22 are oriented so the reinforcing block 48 fits into the slot 24. Once the base is inside the outer sleeve the cover 34 is welded on top of the skirt and thereafter the handle can be welded over the cover and sidewalls of the skirt. Finally, the ring 30 is welded around the lower portion of the legs 20, 22.

The pin puller is used in conjunction with the articulated connection, portions of which are shown in FIG. 5. The connection includes a female connector arm 66 which receives a male connector arm 68. The female connector arm incorporates a center plate 70 which rests on the truck bolster 72. The female connector arm has openings 74 and 76 which, together with the opening 78 in the male connector arm, define the pocket which receives the main connector pin 64.

The use, operation and function of the invention are as follows. The retainer keys or pins that normally hold the main connector pin in place are removed so the connector pin is free to be withdrawn upwardly out of the pocket. To facilitate pulling of the main connector pin 64 the male connector arm 68 is raised until the top of the arm contacts the inside of the female connector arm 66. The appropriately-sized yoke 16 is placed over the loop 62 and the second pin 60 is pushed through aligned openings 58 and the loop to connect the yoke to the top of the main connector pin. The second pin is secured with a cotter (not shown).

Next, the pin puller assembly 10 is placed over the yoke with the legs 20, 22 resting on the top surface of the female connector arm 66. This is done with a crane or hoist whose hook 38 is connected to the handle 36. With the base or inner sleeve 12 resting on the female connector arm, the outer sleeve 14 is raised high enough to insert the hydraulic ram 18 through one of the apertures 40 or 42 onto the platform 28. Once the hydraulic ram is in place, the outer sleeve is lowered so that the underside of the cover 34 sits on top of the ram. Next, the first pin 52 is inserted through the openings 44, 46 and 50 in the sleeve and also through the upper bore 54 in the yoke. A cotter may be used to secure the first pin in place.

After these first and second pins are in place, the hydraulic lines are connected to the ram and pressure fluid is supplied to the ram. As the piston of the ram moves upwardly the outer sleeve moves upwardly with it. This in turn causes the yoke and the main connector pin to move upwardly into the compartment of the base (inner sleeve) 12. Once the main connector pin 64 separates from the connection, the pin puller 10 and main connector pin 64 are removed as an assembly with the attached hoist.

It can be seen that the pin puller of the present invention has universal application to pull pins of any taper, regardless of the car builder design. The interchangeable yokes allow both original and redesigned main connector pins to be pulled. Additionally, yokes could be designed for other applications besides just pulling main connector pins.

While a preferred form of the invention has been shown and described, it will be realized that alterations may be made thereto without departing from the scope of the following claims.

We claim:

1. A pin puller for pulling the main connector pin out of an articulated connector of the type having interfitting male and female connector arms with aligned openings defining a pocket having an open end, the main connector pin having a loop at one end protruding from the open end of the pocket, the pin puller comprising:
   - a base member having at least two legs arranged to be mounted on one of the connector arms in straddling relation with the main connector pin, the legs supporting a platform spanning the legs and spaced from said one connector arm, the legs and platform defining a compartment;
   - an actuator having a stationary portion mounted on the platform and a movable portion adapted for selectably applying a force in a direction away from the open end of the pocket;
   - coupling means engageable with the loop of the main connector pin; and
   - a sleeve engageable for translation with the movable portion of the actuator and connectable to the coupling means to transfer the actuator force to the main connector pin and thereby withdraw the pin from the pocket at least partially into the compartment of the base.

2. The pin puller of claim 1 wherein the sleeve comprises a generally cylindrical skirt surrounding the base and a cover closing one end of the skirt, the cover being in facing relation with the platform.

3. The pin puller of claim 2 wherein the skirt has at least one aperture therein of a size sufficient to permit insertion of the actuator between the platform and cover.

4. The pin puller of claim 1 wherein the coupling means comprises at least one opening in the sleeve, a first pin, a yoke insertable into the sleeve, the yoke having a first bore aligned with the sleeve opening such that the first pin is slidable into the first bore and opening to lock the yoke to the sleeve, a second bore in the yoke aligned with an opening in the main connector pin's loop, and a second pin for locking the yoke to the loop.

5. The pin puller of claim 1 wherein the legs of the base are spaced apart to define a slot therebetween and the sleeve comprises a generally cylindrical skirt surrounding the base, a cover closing one end of the skirt, the cover being in facing relation with the platform and a reinforcing block extending through the slot in the legs at the other end of the skirt and wherein the coupling means comprises aligned openings through opposite sides of the skirt and through the reinforcing block.

6. The pin puller of claim 5 wherein the coupling means further comprises, a first pin, a yoke insertable into the sleeve, the yoke having a first bore aligned with the sleeve openings such that the first pin is slidable into the first bore and sleeve openings to lock the yoke to sleeve, a second bore in the yoke aligned with an opening in the main connector pin's loop, and a second pin for locking the yoke to the loop.

7. The pin puller of claim 1 further comprising a handle attached to the sleeve.

8. A pin puller for pulling the main connector pin out of an articulated connector of the type having interfitting male and female connector arms with aligned openings defining a pocket having an open end, the main connector pin having a loop at one end protruding from the open end of the pocket, the pin puller comprising:
   - a base having at least two legs spaced apart to define a slot and supporting a platform at a top end thereof;
   - a sleeve having a cylindrical skirt surrounding the base, the skirt having top and bottom ends, a cover at the top end in facing relation with the platform and openings aligned with each other and the slot at the bottom end of the skirt;
   - a yoke having first and second bores therein, the yoke being insertable in the bottom end of the skirt to align the first bore with the skirt openings at which point the second bore is aligned with the loop of the main connector pin;

a first pin for connecting the yoke to the skirt through the aligned first bore and skirt openings and a second pin for connecting the yoke to the main connector pin through the aligned second bore and loop; and an actuator mounted on the platform and engageable with the cover to move the sleeve to a raised position.

9. The pin puller of claim 8 wherein the skirt has at least one aperture therein of a size sufficient to permit insertion of the actuator between the platform and cover.

10. The pin puller of claim 8 further comprising a reinforcing block fixed to the skirt at the bottom end thereof and extending through the slot.

11. The pin puller of claim 10 further comprising a handle attached to the sleeve.

12. The pin puller of claim 10 further comprising a ring attached to the legs near the end opposite the platform to stabilize the legs.

13. The pin puller of claim 8 wherein the actuator is a hydraulic ram.

14. A pin puller for pulling the main connector pin out of an articulated connector of the type having interfitting male and female connector arms with aligned openings defining a pocket having an open end, the main connector pin having a loop at one end protruding from the open end of the pocket, the pin puller comprising:

a removable actuator having a movable member coupleable to the main connector pin for applying a pulling force thereto;

a bridge member mountable on the uppermost connector arm, straddling the pocket and having a slot formed therein and a raised platform for mounting the actuator above the main connector pin;

a clevis having a bight engageable with the movable member of the actuator and a first pin fitting in the slot of the bridge member; and a yoke connectable to the first pin and having a second pin connectable to the loop of the main connector pin.

* * * * *